Oct. 4, 1966 D. M. HARVEY ETAL 3,276,154
MOUNT FOR A PIECE OF FILM AND A MEDIUM FOR
STORING SOUND SIGNALS
Filed April 30, 1964
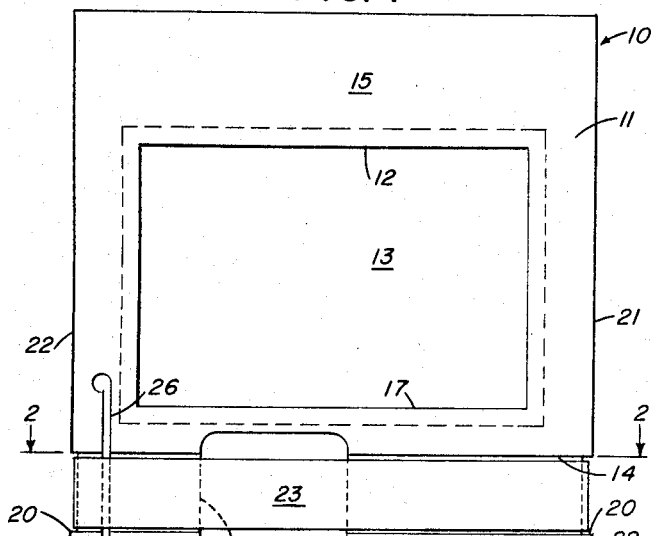
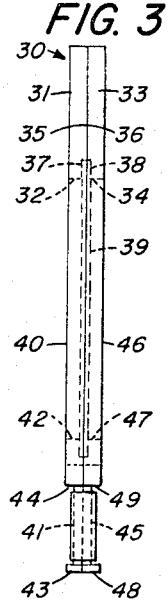
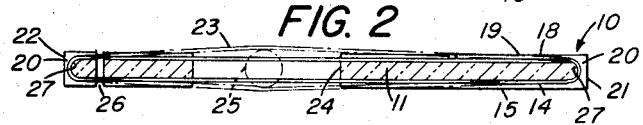
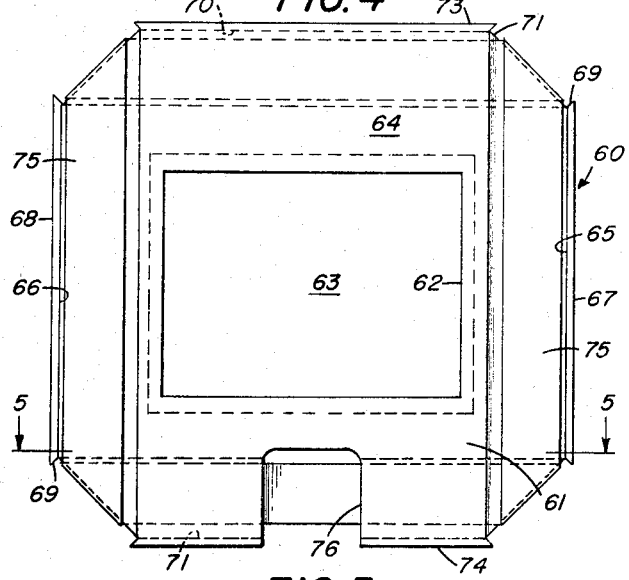
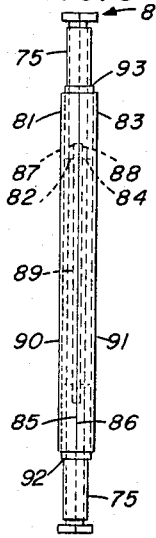
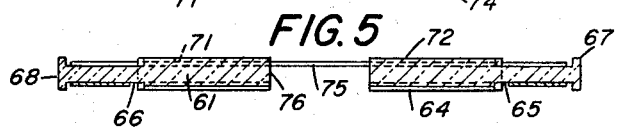
DONALD M. HARVEY
JOHN H. EAGLE
INVENTORS
BY R. Frank Smith
ATTORNEY & AGENT United States Patent Office 3,276,154
Patented Oct. 4, 1966

3,276,154
MOUNT FOR A PIECE OF FILM AND A MEDIUM
FOR STORING SOUND SIGNALS
Donald M. Harvey and John H. Eagle, Rochester, N.Y.,
assignors to Eastman Kodak Company, Rochester,
N.Y., a corporation of New Jersey
Filed Apr. 30, 1964, Ser. No. 363,834
19 Claims. (Cl. 40—28.1)

The present invention relates to a planar device for mounting a piece of film in an aperture and also for mounting a closed loop of a medium for storing sound signals. More particularly the invention relates to a mount for supporting a closed loop of material for movement in a path surrounding the mount adjacent the aperture.

It is well known in the prior art to use a sound record in the form of a disc or a length of magnetic tape in conjunction with a slide projector for providing prerecorded commentary for each slide. In such an arrangement, provision is made to control the changing of the slide either manually or automatically in response to a prerecorded signal on the disc or tape. One of the disadvantages of such a system is that considerable difficulty is encountered in re-viewing a slide in that the related portion of the sound track must also be relocated if there is to be an audio-visual presentation.

The prior art also discloses a slide mount having a sound track carrier that is supported on the mount at one side of the film transparency. Such a carrier can be a part of the mount or a separate member that is rotatably mounted at one side of the film transparency. This arrangement also possesses disadvantages in that the mount must be made considerably larger in order to accommodate the sound carrier, and the carrier per se is not easily removable from the mount in the event the commentary is to be changed or the carrier should be damaged.

The mount described in more detail hereinafter is substantially the same size as a standard transparency mount that is used in slide projectors. The mount is provided with a continuous recess in which a closed loop of a medium for storing sound signals is retained for movement in a path surrounding the mount. Such a continuous recess can be formed in the mount in several ways so as to provide paths of different lengths for the medium and, hence, different storage lengths for sound signals. In any case, the medium is retained in the recess so that the overall thickness of the mount is not increased. Also, the medium for storing the sound signals can be easily replaced in the event the commentary is to be changed or the medium is damaged in any way.

The primary object of the invention is to provide a mount for a piece of film and a closed loop of a medium that can be moved in a path surrounding the mount adjacent the aperture therein and on which sound signals can be stored, or are already stored, and which are related to the piece of film in the mount.

Another object of the invention is to retain a closed loop of a medium for storing sound signals on a slide mount so that it can be moved in a path surrounding the mount adjacent the aperture therein and past a record head for storing sound signals, or for moving the medium past a reproduce head for reproduction of the signals already recorded on the medium.

Still another object of the invention is to provide a mount for a piece of film and a closed loop of a medium on which sound signals can be stored, or are already stored, that are related to the piece of film, the medium being inseparable from the mount and movable over and around the latter.

A further object of the invention is to provide a transparency mount that carries a medium for storing sound signals which is in the form of an endless strip and movable in a path surrounding the mount adjacent the aperture therein.

A still further object of the invention is to provide a transparency mount on which an endless strip of a medium for recording sound signals is moved and retained in a continuous recess arranged around the mount adjacent the aperture therein so that the overall dimensions of the mount are comparable to a standard transparency mount.

These and other objects and advantages of the invention will be apparent to those skilled in the art by a more detailed description which follows hereinafter.

Reference is now made to the accompanying drawing wherein like reference numerals indicate like parts and wherein:

FIG. 1 is a front elevational view of one embodiment of the invention;

FIG. 2 is a sectional view taken substantially along the line 2—2 in FIG. 1 and shows in dotted lines the form that the endless strip can take when inserted in a projector relative to a capstan roller;

FIG. 3 is a side elevational view of an embodiment of the mount shown in FIG. 1;

FIG. 4 is a front elevational view of another embodiment of the invention;

FIG. 5 is a sectional view taken substantially on the line 5—5 of FIG. 4; and

FIG. 6 is a side elevational view of an embodiment of the mount shown in FIG. 4.

Reference is now made with respect to FIGS. 1 and 2 of the drawing in which one embodiment of a mount is disclosed. A mount 10 comprises a planar frame member 11 that is rectangular in shape and provided with a central aperture 12 that is smaller than and similar in size and shape to a piece of film 13 that is secured in registry therewith. The frame member 11 can be made of a number of materials so long as the frame member provides a relatively rigid support that withstands handling and repeated insertion into and withdrawal from a slide projector. The frame member can be a single piece of material that is formed in accordance with the description which follows or it can comprise two members that are secured together to provide a unitary mount. The mount 10 can, therefore, be made from cardboard, metal or a suitable plastic material. The manner in which the frame member can be made from any one of the aforementioned materials is described hereinbelow.

In the event the frame member 11 is made from a single sheet of material, the piece of film 13 can be arranged in registry with the aperture 12 by securing the piece of film to one surface of the frame member so that it overlies the aperture, by providing a recess in which the piece of film can be similarly retained so as to not increase the overall thickness of the mount, or by securing the piece of film by means of a frame or sheet of transparent material having an adhesive on one surface thereof.

The frame member 11 is provided with a first rectangular recess 14 in one surface 15 thereof that is arranged between an edge 16 of the frame member and a corresponding edge 17 of the aperture 12. The recess 14 extends parallel to these edges and a second recess 18 is also formed in the other surface 19 of the frame member. A notch 20 is formed in each of the edges 21 and 22 of the frame member 11 and is aligned with the respective ends of the recesses 14 and 18. The width and depth of the recesses and the notches are at least substantially the same as the corresponding dimensions of a strip of a medium for recording sound signals designated by the numeral 23. A notch 24 is formed inwardly from the edge 16 and intersects the recesses 14 and 18 to provide access to the medium for splicing the medium into a closed loop, when it is positioned on the mount 10 and in the recesses 14 and 18, and for providing a receptive portion into which a capstan roller 25 can be positioned when the mount is inserted in a slide projector.

As shown in FIG. 2, the capstan roller 25 causes a shortening of the length of the medium 23 due to the fact that the roller is of a diameter larger than the thickness of the frame member 11. In order to compensate for this shortening of the length of the medium and for maintaining the medium taut on the frame member, a slit 26 is provided which extends inwardly from the edge 16 and intersects the recesses 14 and 18. A portion of the frame member 11 between slit 26 and edge 22 serves to resiliently bias the medium 23.

The recesses 14 and 18 together with the notches 20 provide a continuous recess around the frame member 11 adjacent the aperture 12 in which the medium 23 is supported and movable when positioned in a projector relative to the capstan roller 25. The sharp edges formed by the intersection of recesses 14 and 18 and notches 20 can be rounded, as shown by numeral 27 in FIG. 2, to facilitate movement of medium 23 around such edges.

From the description thus far, it can be readily appreciated that the planar member 11 can be made in a number of ways from various types of material. For example, when the frame member 11 comprises a single sheet of material such as cardboard or metal, the recesses 14 and 18 and the notches 20 can be readily formed by an embossing process. On the other hand, when a plastic material is used, the aperture 12 and the various recesses and notches can be formed at the same time that the frame member 11 is molded.

With reference to FIG. 3, a mount 30 comprises a first planar frame member 31 having a central aperture 32 and a second planar frame member 33 having a central aperture 34. The facing surface 35 and 36 of each frame member is formed with a recess 37 and 38, respectively, said recesses being larger than their respective apertures 32 and 34, and substantially of the same size and shape as a piece of film 39. The other surface 40 of frame member 31 is provided with a recess 41 that lies between an edge 42 of aperture 32 and an edge 43 of frame member 31 and terminates with the notches 44 in the edges of the frame member. A second recess 45 is formed in the surface 46 of frame member 33 and lies between an edge 47 of aperture 34 and an edge 48 of the frame member and terminates with notches 49 in the edges of the frame member. The piece of film 39 is then positioned in the recess 37 or 38 and the frame members 31 and 33 are secured together to hold the film therebetween in registry with the apertures 32 and 34. With the joining of the frame members, a continuous recess for the medium 23 is then automatically formed which is substantially the same as that shown in FIGS. 1 and 2. Each of frame members 31 and 33 can be made with a portion of notch 24 and slit 26 which are located so as to form a single notch and slit when the frame members are secured together.

The term "medium for storing sound signals" can be interpreted as a piece of photographic film, magnetic tape, or any similar material that is capable of storing sound signals. Also, this same phrase is to be interpreted as meaning any one of the aforementioned materials before sound signals have been stored thereon or after sound signals have been stored thereon. Since such a material can be retained on the mount 10 and then positioned in a slide projector for recording appropriate sound signals relating to the transparency being projected or can be used for providing a reproduction of the sound signals already stored thereon, either of these arrangements are meant to be covered by the above expression.

Reference is now made to FIGS. 4 and 5 of the drawing in which another embodiment of the invention is disclosed. A mount 60 comprises a single planar frame member 61 having a central aperture 62 in registry with which a piece of film 63 can be secured as described above. One surface 64 of the frame member 61 is provided with a first pair of recesses 65 and 66. The edges of the recesses are parallel to one pair of opposite edges of aperture 62 and edges 67 and 68 of the frame member. The corners of the frame member 61 are provided with notches 69 that are arranged on a diagonal and in which the recesses 65 and 66 terminate. A second pair of recesses 70 and 71 are also formed in the other surface 72 of the frame member 61. This latter pair of recesses are arranged parallel to the other pair of opposite edges of the aperture 62 and edges 73 and 74 of the frame member. The recesses 70 and 71 are at right angles to the recesses 65 and 66 and also terminate at notches 69.

A medium for storing sound signals, generally indicated by the numeral 75 is wrapped over and around the frame member 61 as shown in FIG. 4, that is, alternately from one to the other of surfaces 64 and 72 of the frame member. The medium 75 is joined together to form an endless length that is retained on the mount by the recesses 65, 66, 70 and 71 and notches 69, which are, as described above, of a width and depth at least substantially the same as that of the corresponding dimensions of the medium 75. A notch 76 is formed in one of the edges, such as edge 74, of the frame member 61 and extends inwardly to intersect the recess 65. The notch 76 serves the same dual purposes as described above with respect to the embodiment shown in FIGS. 1–3. It should be readily apparent that in this embodiment of the invention a longer length of medium 75 can be used with a corresponding longer sound track being available for the slide commentary.

In place of the separate recesses formed in each surface of the frame member 61, particularly if the frame member 61 is made of a plastic material, the recesses 65 and 66 in surface 64 and the recesses 70 and 71 in surface 72 can be made into a single recess that completely surrounds the aperture 62. In this case, a land is formed around the aperture and the medium 75 is then wrapped over and around the frame member 61 in exactly the same manner and joined to form an endless length that is movable over and around the mount 60 adjacent the aperture 62.

With reference to FIG. 6, a mount 80 comprises a first planar frame member 81 having a central aperture 82 and a second planar frame member 83 having a central aperture 84. The facing surface 85 and 86 of each frame member is formed with a recess 87 and 88, respectively, said recesses being larger than their respective aperture 82 and 84 and substantially of the same size and shape as a piece of film 89. The other surface 90 and 91 of the frame members is provided with a pair of recesses or a continuous recess, designated by 92 and 93, which terminate in bias-cut corners on notches, as described with respect to FIGS. 4 and 5. When the frame members 81 and 83 are secured together with the piece of film 89 retained therebetween, a continuous recess is provided in which the medium 75 can be retained and moved and the mount 80 then becomes substantially the same as mount 60 in appearance and in function.

It can be readily appreciated that the embodiment of the invention shown in FIGS. 4–6 can also be made from various materials and in various forms as described above with respect to the embodiments shown in FIGS. 1–3. While each of the embodiments discloses a notch 24 or 76, which permits access to the tape for moving it or for splicing its ends together, these notches can be eliminated so that the capstan roller can engage the medium to hold and move it along the bottom surface of one of the recesses. In this case, the medium can be formed into a closed loop before it is mounted on the frame member and can be easily mounted if the lip 28 at one of the notches 20, as seen in FIG. 1, is removed and one of the side lips 67, as seen in FIG. 4, is removed. The medium can be retained without these lips because the medial length of the continuous recess in any one of the embodiments must be substantially the same as that of the medium.

While various embodiments of the invention have been disclosed and described with reference to different types of materials, the invention is not to be limited to such disclosures but is to be of a scope as defined by the appended claims.

We claim:

1. Means for mounting both a piece of film and a closed loop of a medium for storing sound signals, said means comprising in combination:
   a planar frame member having an aperture for supporting said piece of film and a notch extending inwardly from an edge thereof;
   means on said frame member for supporting said medium for movement in a path surrounding said frame member adjacent said aperture and intersecting said notch, the latter providing access to the surface of said medium contiguous to said frame and overlying said notch.

2. Means in accordance with claim 1 wherein said supporting means comprises a continuous recess in the surfaces of said frame member for said medium, the medial length of said recess being substantially the same as that of said medium.

3. Means for mounting both a piece of film and a closed loop of a medium for storing sound signals, said means comprising in combination:
   a rigid, planar frame member having an aperture for supporting said piece of film;
   a pair of aligned notches, each of which is formed in an opposite edge of said frame member; and
   a pair of recesses, each of which is formed in a different surface of said frame member between said aperture and an edge of said frame member joining said opposite edges and coextensive with said notches to provide a continuous path around said frame member adjacent said aperture, the peripheral length of which is substantially the same as that of said medium; and
   said notches and said recesses being of a width and a depth for supporting said medium on said frame member.

4. Means in accordance with claim 3 wherein said frame member is provided with a notch extending inwardly from said edge and intersecting said path to provide access to the surface of said medium contiguous to said frame member and overlying said notch.

5. Means in accordance with claim 4 wherein said frame member is provided with a slit extending inwardly from said edge parallel to and adjacent one of said opposites edges and intersecting said path, the portion of said frame member between said slit and the one of said opposite edges serving to maintain said medium taut.

6. Means in accordance with claim 4 wherein said frame member is provided with a notch extending inwardly from an edge thereof intersecting said path to provide access to the surface of said medium contiguous to said frame member and overlying said notch.

7. Means for mounting both a piece of film and a closed loop of a medium for storing sound signals, said means comprising in combination:
   a rigid, planar frame member having a central aperture for supporting said piece of film;
   a rectangular notch in each of an opposite pair of edges of said frame member;
   a first recess formed in one surface of said frame member between said aperture and an edge of said frame member joining said opposite edges and coextensive with each of said notches; and
   a second recess in the other surface of said frame member corresponding to and in registery with said first recess;
   said notches and said recesses being of a width and a depth at least substantially the same as the corresponding dimensions of said medium to provide a continuous path surrounding said frame member adjacent said aperture in which said medium is supported, the medial length of said path being substantially the same as that of said medium.

8. Means in accordance with claim 7 wherein said frame member is provided with a notch extending inwardly from said edge and intersecting said path to provide access to the surface of said medium contiguous to said frame member and overlying said notch.

9. Means in accordance with claim 8 wherein said frame member is provided with a slit extending inwardly from said edge parallel to and adjacent one of said opposite edges and intersecting said path, the portion of said frame member between said slit and the one of said opposite edges serving to maintain said medium taut.

10. Means for mounting both a piece of film and a closed loop of a medium for storing sound signals, said means comprising in combination:
    a rigid, rectangular frame member having bias-cut corners forming diagonal edges and a central rectangular aperture for supporting said piece of film;
    a first pair of recesses in one surface of said frame member, each of said first pair of recesses being arranged between said aperture and parallel to one of a pair of opposite edges of said frame member and extending from one to the other of said diagonal edges intersecting said one edge; and
    a second pair of recesses formed in the other surface of said member at right angles to said first pair of recesses, each of said second pair of recesses being arranged between said aperture and parallel to one of the other pair of opposite edges of said frame member and extending from one to the other of said diagonal edges intersecting said one edge of said other pair of opposite edges;
    said first and second pairs of recesses being of a width at least the same as that of said medium for supporting the latter on said frame member when it is arranged over and around said frame member adjacent said aperture, the medial length of the recesses being substantially the same as that of said medium.

11. Means for mounting both a piece of film and a closed loop of a medium for storing sound signals, said means comprising in combination:
    a rigid, rectangular frame member having a central rectangular aperture for supporting said piece of film;
    a first recess in one surface of said frame member, the inner edges of which are spaced from and parallel to the edges of said aperture and the outer edges of which are parallel to said inner edges and spaced from the edges of said frame member;
    a second recess in the other surface of said frame member corresponding to and in registry with said first recess; and
    a notch formed diagonally with respect to each corner of said frame member;
    said recesses and said notches being of a width at least substantially equal to that of said medium and supporting the latter for movement in a path surrounding said frame member adjacent said aperture that is formed by portions of said first recess along one pair of opposite edges of said aperture, by portions of said second recess along the other pair of opposite edges of said aperture and by said notches, the medial length of said path being substantially equal to the medial length of said medium.

12. Means in accordance with claim 11 wherein said frame member is provided with a notch extending inwardly from said edge and intersecting said path to provide access to the surface of said medium contiguous to said frame member and overlying said notch.

13. Means for mounting both a piece of film and a closed loop of a medium for storing sound signals, said means comprising in combination:
a pair of substantially identical planar frame members, each having a central aperture and a recess in one surface thereof that is larger than said aperture and corresponds substantially in size and shape to said piece of film, said members being secured together for retaining said piece of film in said recesses; and
means on each of the other surfaces of said frame members for supporting said medium for movement in a path surrounding said frame members adjacent said apertures.

14. Means in accordance with claim 13 wherein said supporting means comprises a recess in the other surface of each of said frame members, said last mentioned recesses providing a continuous path from one frame member to the other and having a medial length substantially the same as that of said medium.

15. Means in accordance with claim 14 wherein said frame members are provided with a notch extending inwardly from an edge thereof and intersecting said continuous recess to provide access to the surface of said medium contiguous to said frame members and overlying said notch.

16. Means for mounting both a piece of film and a closed loop of a medium for storing sound signals, said means comprising in combination:
a pair of substantially identical rectangular frame members, each having a central rectangular aperture and a first recess in one surface thereof that is larger than said aperture and corresponds substantially in size and shape to said piece of film;
a pair of aligned notches in each of said frame members, each of which is formed in an opposite edge thereof; and
a second recess in the other surface of each of said frame members which is arranged between and parallel to an edge of said aperture and of said frame member and is coextensive with said notches; said frame members being secured together with said first recesses facing one another for retaining said piece of film; and
said notches and said second recesses being of a width and a depth at least substantially the same as the corresponding dimensions of said medium for supporting the latter for movement in a continuous path surrounding said frame members adjacent said apertures, the medial length of said continuous path being substantially the same as that of said medium.

17. Means in accordance with claim 16 wherein said mounting means is provided with a notch extending inwardly from said one edge of said frame members and intersecting said continuous path so that access can be had to the surface of said medium contiguous to said mount and overlying said notch.

18. Means in accordance with claim 17 wherein said mounting means is provided with a slit extending inwardly from said edge of said frame members parallel to and adjacent one of said opposite edges and intersecting said continuous recess, the portion of said frame members between said slit and the one of said opposite edges serving to maintain said medium taut.

19. Means for mounting both a piece of film and a closed loop of a medium for storing sound signals, said means comprising in combination:
a pair of substantially identical rectangular frame members, each having a central rectangular aperture, a first recess in one surface thereof that is larger than and aligned with said aperture and corresponding substantially in size and shape to that of said piece of film, a second recess in the other surface thereof, the inner edges of which are spaced from and parallel to the edges of said aperture and the outer edges of which are spaced from and parallel to the edges of said frame member; and a notch formed diagonally with respect to each corner of said frame member;
said frame members being secured together with said first recesses facing each other for retaining said piece of film; and
said notches and said second recesses being of a width and a depth at least the same as the corresponding dimensions of said medium for supporting the latter for movement in a path surrounding said frame members adjacent said aperture that is formed by portions of said second recesses along one pair of opposite edges of said aperture, by portions of said second recesses along the other pair of opposite edges of said aperture and by said notches, the medial length of said path being substantially equal to the medial length of said medium.

References Cited by the Examiner
UNITED STATES PATENTS

| | | | |
|---|---|---|---|
| 2,293,301 | 8/1942 | Mitchell | 40—340 |
| 2,314,417 | 3/1943 | Neal | 40—340 |
| 2,639,530 | 5/1953 | Merrill | 40—152 |
| 2,968,884 | 1/1961 | Anastasio | 40—152 |
| 3,176,580 | 4/1965 | Metz | 40—28.1 |

EUGENE R. CAPOZIO, *Primary Examiner.*

W. J. CONTRERAS, *Assistant Examiner.*